United States Patent [19]

Hendrickson

[11] 4,336,539

[45] Jun. 22, 1982

[54] NAVIGATIONAL AID DEVICE

[76] Inventor: Alvin E. Hendrickson, 457 Elm Ave., Chula Vista, Calif. 92010

[21] Appl. No.: 120,656

[22] Filed: Feb. 11, 1980

Related U.S. Application Data

[63] Continuation-in-part of Ser. No. 948,702, Oct. 5, 1978, abandoned.

[51] Int. Cl.³ .............................. G01S 7/06; H04N 7/12
[52] U.S. Cl. .............................. 343/6 TV; 343/55 C; 358/140
[58] Field of Search .................. 343/6 TV, 55 C; 358/140

[56] References Cited

U.S. PATENT DOCUMENTS

| | | | |
|---|---|---|---|
| 2,632,157 | 3/1953 | Jones | 343/6 TV |
| 3,750,164 | 7/1973 | Anderson | 343/6 TV X |
| 3,836,961 | 9/1974 | Ennis et al. | 343/6 TV |
| 4,071,843 | 1/1978 | Marien | 343/6 TV X |
| 4,081,802 | 3/1978 | Elmore et al. | 343/6 TV X |
| 4,208,721 | 6/1980 | Eisenberg | 343/55 C X |
| 4,214,269 | 7/1980 | Parker et al. | 343/55 C X |

FOREIGN PATENT DOCUMENTS 2015848  9/1979  United Kingdom ............... 358/140

Primary Examiner—Malcolm F. Hubler
Attorney, Agent, or Firm—Henri J. A. Charmasson

[57] ABSTRACT

A method and apparatus for converting a plan position indicating (PPI) radar image signal into a raster-type video signal and for broadcasting the radar image over an area scanned by the radar beam, where it can be received by a craft traveling within said area. Means are also provided on board each craft for indicating the position of the craft on said image. The PPI radar image signal is first converted to a digital form and stored in a memory unit; then extracted from the memory unit in a format compatible with the television raster display system. The radar image is broadcasted in its PPI form and converted on-board the craft. Means are provided on the crafts for synchronizing the radar image signal with an enhancing signal generated every time the radar beam sweeps over the corresponding crafts.

11 Claims, 7 Drawing Figures

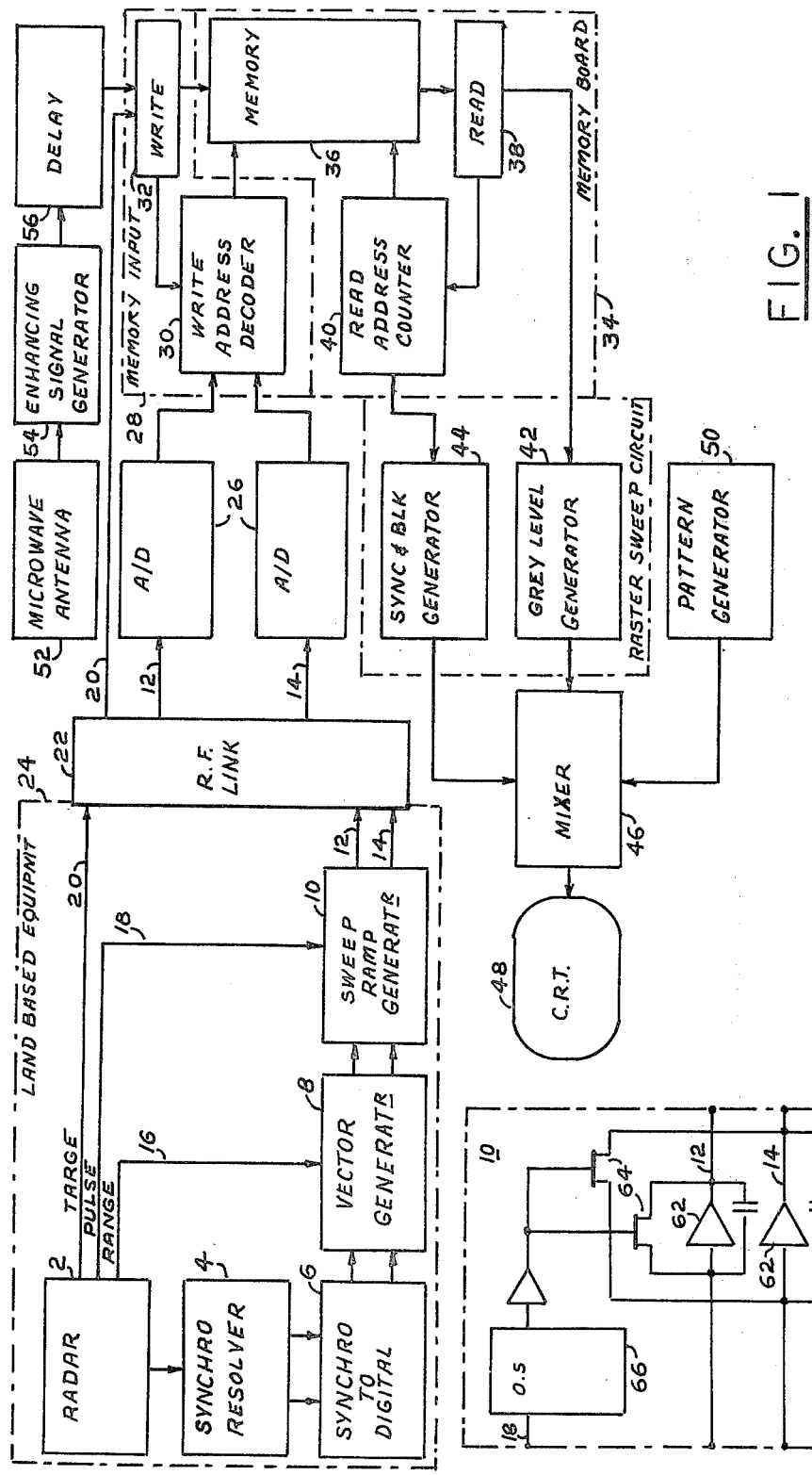

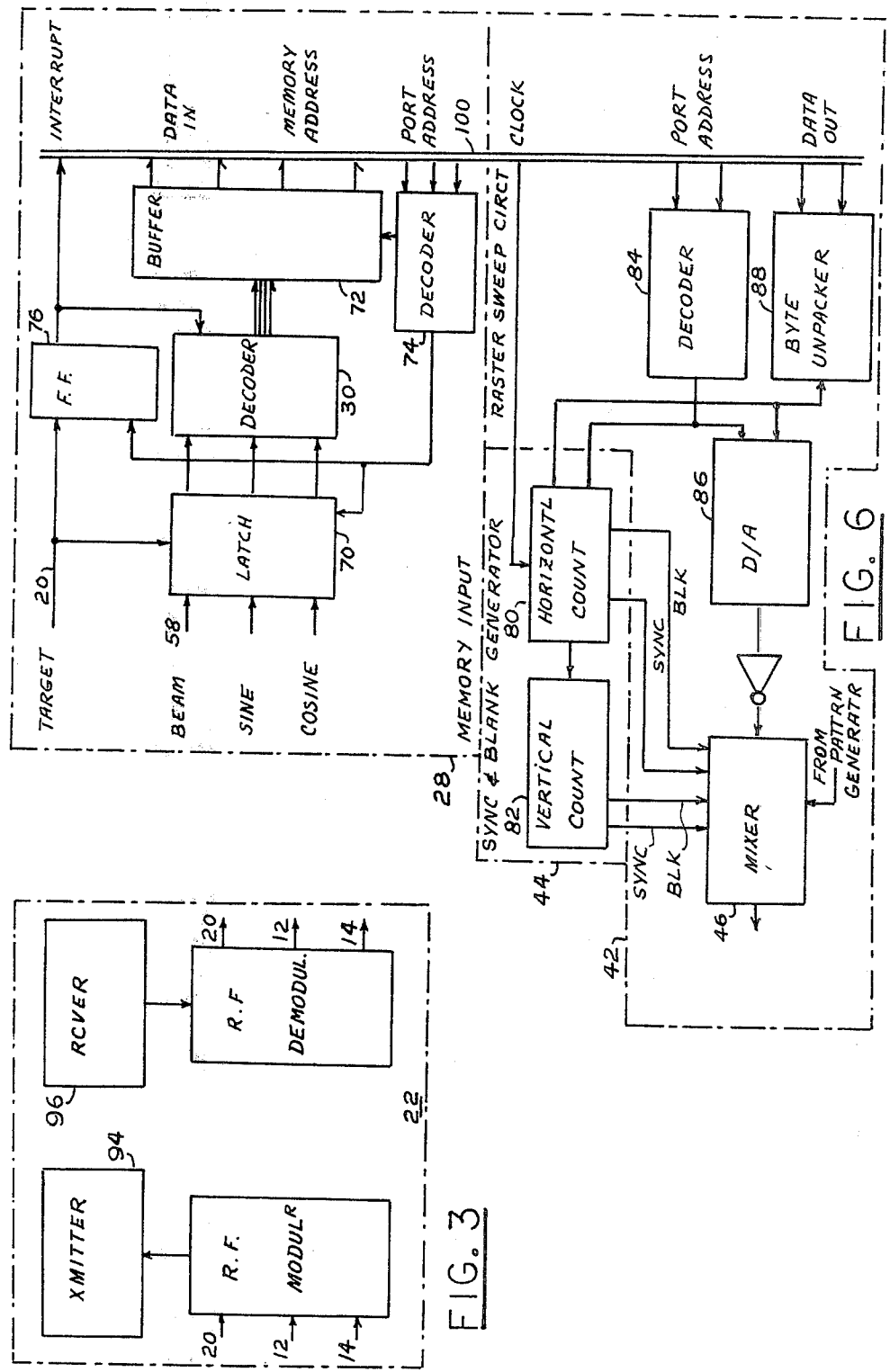

4,336,539

NAVIGATIONAL AID DEVICE

PRIOR APPLICATION

This application is a continuation in part of copending application Ser. No. 948,702, filed Oct. 5, 1978, now abandoned.

FIELD OF THE INVENTION

The invention relates generally to navigational aids and more particularly to pulse-echo radar systems for marine applications which make use of on-board conventional television receivers as radar display devices.

PRIOR ART

Various attempts have been made in the past to provide a means for converting a plan position indication (PPI) radar display into a video signal compatible with standard raster-type television receivers. These devices are intended to provide an inexpensive system for displaying aboard an aircraft or ship the image of a shore-based radar station. Typical systems are disclosed in U.S. Pat. No. 3,750,164, Henderson, and U.S. Pat. No. 3,836,961, Ennis, et al. The latter reference is particularly related to the present invention in that it suggests the use of a digital process to transform the PPI radar signal into a raster-type signal. The Ennis patent, however, fails to disclose the method followed or the means used to effect such a conversion in a practicable way.

SUMMARY OF THE INVENTION

The main object of this invention is to provide a practical method and means for converting the rotating display signal of a PPI radar image into a raster-type video signal compatible with standard television receivers. A further object of this invention is to provide a means for broadcasting a video image of a monitored area to crafts operating within that area. A further object of the invention is to provide a means for the instantaneous location on board a particular craft of its position on the screen of its television receiver displaying its radar image. These and other objects of the invention are achieved by first converting the radar antenna azimuth sine and cosine signals into a storage memory address and writing a one into the memory at such generated address when a target echo pulse is received by the radar antenna. The memory is then read sequentially under the control of an address counter. Vertical and horizontal synchronization and blanking signals are intermixed with the data extracted from the storage memory in order to form a raster-type video signal. Means are provided for broadcasting the radar image before format conversion. A microwave antenna is used on the craft to detect the radar beam and to generate an enhancing signal which is applied to the television display at the time the image of that very craft is being drawn on the television screen. In a departure from the prior art which suggests that the synchronization between the radar image and enhancing signal be done after the format conversion, the invention discloses a more accurate method for identifying the craft on the radar image before format conversion.

BRIEF DESCRIPTION OF THE DRAWING

FIG. 1 is the general block diagram of a system embodying the invention;

FIG. 2 is a schematic of the vector sweep generator;

FIG. 3 is the block diagram of the RF link;

FIG. 6 is a block diagram of the memory input control and raster sweep circuit.

DETAILED DESCRIPTION OF THE PRFERRED EMBODIMENT

Figure 4:
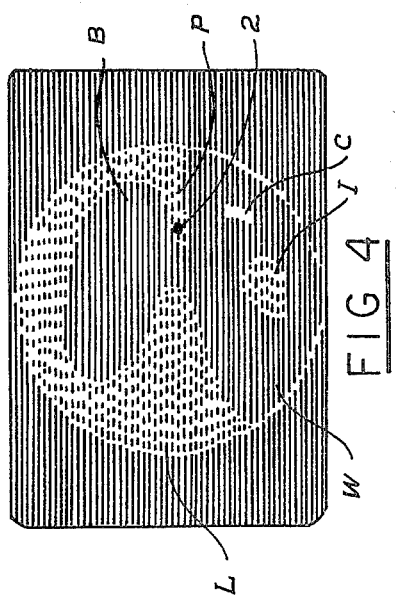
FIG. 4 is a pictorial representation of the raster sweep display on the CRT.

Referring now to the drawing, I shall describe the preferred embodiment of the invention in connection with a hypothetical situation. This embodiment is designed to provide on board a craft C navigating within coastal waters W a radar image (as depicted in FIG. 4) derived from a radar antenna 2 which is installed on the tip of a pennisula P attached to a land mass L at the entrance of a bay B. The system also provides a means for enhancing on the screen of the CRT 48 the trace representing the craft C. It should be understood that a similar system could be used as a navigational aid on board aircrafts as well as land vehicles.

In the general block diagram of FIG. 1 the land based equipment is grouped in block 24 and the remainder of the system is carried on board the craft C. Block 22 represents the radio frequency link between the shore and the craft C. The land based equipment comprises a radar 2 whose antenna makes a 360° sweep of the coastal area. A synchro-resolver 4 generates a dual signal representing the azimuthal orientation of the radar antenna 2. This dual signal is converted into a digital form by the synchro-to-digital converter 6. The digital azimuth data and an analog range signal 16 derived from the radar 2 are applied to a vector generator 8 which in turn creates sine and cosine azimuth signals proportional to the product of the range signal 16 with each of the two digital signals. The analog outputs of the vector generator 8 are applied to a vector sweep generator 10 which uses the timing pulse signal 18 from the radar to generate two radial sweep ramp signals 12 and 14. The relationship between the two analog signals 12 and 14 is that of the sine and cosine of the radar antenna azimuth. On board craft C, the radial vector signals 12 and 14 are combined with the target echo pulses 20 issued from the radar 2 which have been transmitted over the entire coastal area. The radio frequency link is illustrated in the block diagram of FIG. 3. This type of system is well known to people skilled in the art and requires no further explanation.

Figure 5:
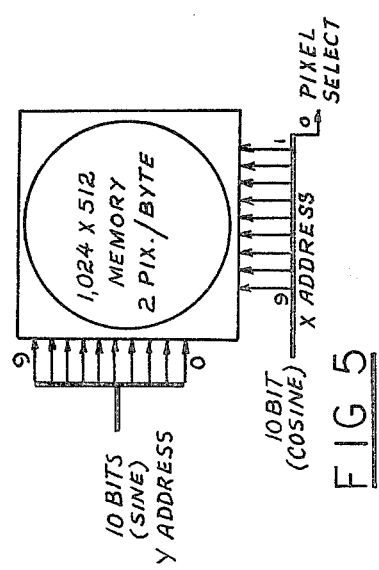
FIGS. 5 and 5A are diametrical representations of the storage memory.

On board the aircraft C the radial sweep signals 12 and 14 are each applied to an analog-to-digital converter 26, the outputs of which are processed through a write address decoder 30 in order to generate an address for a digital memory 36. The target pulses 20 are applied to the memory write control unit 32 in order to write an information in memory every time a target pulse is detected in the location corresponding to the address derived from the radial sweep signals 12 and 14. It should be emphasized at this point that the addressing of the memory 36 is made in a totally random fashion in order to maintain inside the memory 36 a direct correlation between the memory address and the position of the radar antenna at the time a particular target pulse 20 is received. The topography of the memory 36 is illustrated in the diagram of FIG. 5. The memory 36 comprises 524,288 locations. Each location can hold an eight-bit byte. Each byte is subdivided into two picture elements (pixel) of four bits each. Each of the analog-to-digital converter 26 has a ten bit output signal. The nine most significant bits from the analong-to-digital converter receiving the azimuth cosine signal 14 are used as the nine least significant bits (X axis) of the memory address. The least significant bit is used to designate the first or second pixel in each byte. The ten bits issued from the analog-to-digital converter which receives the sine signal 12 are used as the ten most significant bits (Y axis) of the memory address. Each pixel having four bits can define sixteen gray levels for the cathode ray tube image. However, in this particular application only three discrete gray levels will be used as explained later on. On the craft C, a microwave antenna 52 is used to detect the instant the radar beam from shore sweeps over the craft C. The signal detected by the microwave antenna 52 is appropriately shaped in the enhancing signal generator 54, delayed at 56 in order to compensate for the RF transmission time of the address signal, then used in the coding of the data written in the pixel being addressed at the time, along with the target pulse 20. In this embodiment, a zero is written in the pixel if no target pulse is present. A four is written if the target pulse is detected but there is no microwave antenna signal 58. When both the target pulse and the microwave antenna signal 58 are present a 16 is written into the half-byte or pixel.

The memory 36 is read under the control of an address counter 40 which has twenty binary stages. The least significant bit selects the first or second half of each byte. The read address counter 40 controls a sync and blank generator whose outputs are combined with the output of the gray level generator 42 in mixer 46 in order to create a video signal. The gray level generator 35 is a digital-to-analog converter which converts each pixel information into three discrete gray levels. The video signal is applied to a CRT 48 which displays an image in the manner illustrated in FIG. 4. The output of a pattern generator 50 may be combined with the video signal in order to superimpose a navigational graph on the radar image. On the CRT image illustrated in FIG. 4 the contrast between the water W, the land mases L and I and the trace representing the craft C is obtained by translating the gray level of the pixel corresponding to a lack of target pulse (the water) as black; the pixel lever 4 representing a target as medium gray; and creating the brightest contrast when a full pixel corresponding to a coincidence between the target pulse and the detection of the radar beam is encountered. Consequently, the trace representing the craft C is clearly identified on the screen of the CRT.

Most of the elements represented in the block diagram of FIG. 1, such as the radar 2, the synchro-resolver 4 and the synchro-to-digital converter 6 are devices which are well known to persons skilled in the electronic art. The vector generator 8 may be implemented with a DTM1716 series digital vector generator manufactured by Analog Devices of Norwood, Massachusetts. The schematic of the vector sweep generator 10 is illustrated in FIG. 2 and comprises two integrating amplifiers 62 in which the feedback capacitors are shorted by means of MOS switches 64 which are opened on the leading edge of the radar pulse and closed after a time interval derived from the one shot 66 and determined by the radar range. The schematic of the memory input control section 28 is given in FIG. 6. The output of the analog-to-digital converters 26 are stored in latches 70 upon detection of a target pulse 20. Flip-flop 76 is also set to generate an interrupt signal applied to the memory bus 100 through buffer circuit 72. The output of flip-flop 76 is also fed to a decoder 30 along with the output of the latches. The resulting data and memory address information is held on the bus until it is read into the memory. Preferably, the memory 36 and associated circuitry are implemented with a microprocessor which will address the memory input control 28 and the raster sweep circuit 42 as two separate units having distinct port addresses. The packing of the two pixels into a single byte may be achieved through a simple routine as follows:

Upon detecting the interrupt signal from the memory input control circuit 28 the port address corresponding to the memory input control circuit 28 is presented on the bus 100 where it is combined with an enable signal into decoder 74 for enabling the buffer 72. The memory address is read into the memory counter and the current contents of the byte is loaded into an operational register. At that point the data corresponding to the gray level is read from the bus into the same operational register and substituted for one-half of the byte data in accordance with the status of the pixel selection bits. The operational register data is then written into memory in place of the current contents.

The memory 36, and associated read address counter 40 and read control unit 38 are preferably those of the micro processor.

The raster sweep circuit 42 is illustrated in FIG. 6. It comprises the horizontal count source 80 and vertical count source 82 which are driven by a clock signal received on the bus 100. They generate the horizontal and vertical synch and blank signals. This type of circuit is well known to those skilled in the electronic art.

The unpacker 88 is designed to feed one half-byte, i.e., a pixel to converter 86. The byte unpacker 88 is controlled by the first stage of the horizontal count source 80. The decoder 84 recognizes the raster sweep circuit identification code on the bus and in response thereto enables its various elements. The raster sweep circuit 42 described here can conveniently be replaced with a Gray Level Graphics Monitor Interface units, Direct Memory Access (DMA) and Digital to Analog (D/A) boards, manufactured by Environmental Interfaces of Cleveland, Ohio. These boards have a standard S100 type bus interface which is compatible with IMSAI and ALTAIR type processors.

Figure 5A:
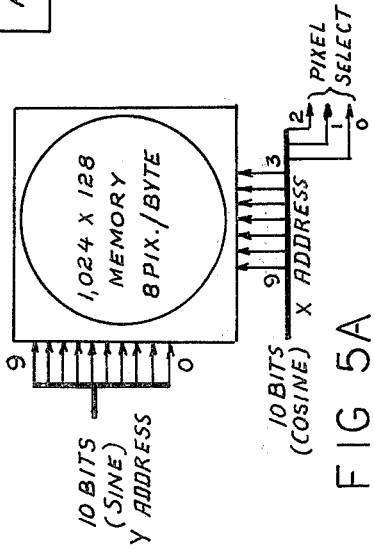

The memory size requirement could be decreased at the expense of resolution, by reducing the number of raster lines; or by using a smaller pixel size. The resulting reaction in the number of gray levels would attenuate the contrast between target spots, non-target spots, and the enhanced craft location. In the extreme example illustrated in the diagram of FIG. 5A, a one-bit pixel (eight pixels per byte) is used. The memory capacity requirement is thus reduced to 131,072 words or bytes, without loss of resolution on the CRT screen. With only two gray levels available, the enhancement of the craft image must be done according to the following procedure. During the write cycle, a zero is written in the memory for non-target locations, and a one is written when the target pulse is present. When the radar beam is sensed by the craft microwave antenna 52, the memory 36 is cleared and a one is written in each target location; but only during the detection time of the radar beam. The procedure is repeated for every other radar scan cycle. On the screen of the CRT monitor, the image of the craft is displayed twice as often as the other targets, and thus appears in sharp contrast.

Figure 7:
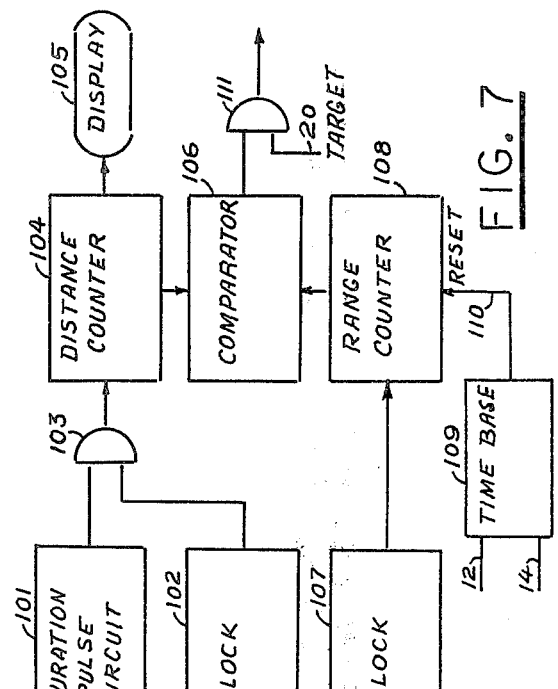
FIG. 7 is a block diagram of distance measurement circuit.

Due to the conical shape of the radar beam, the time during which the beam impinges on the microwave antenna 52 of the craft C is directly proportional to the distance of the craft from the radar station 2. In radar installation where the beam is preceded by an identification signal (IFF), the time elapsing between detection of the IFF signal and detection of the radar beam is also proportional to the distance between the craft C and the radar station. The block diagram of FIG. 7 illustrates how these time measurements may be used, not only to compute the distance from the radar station, but also to positively identify the craft on the CRT screen.

Block 101 represents the circuits necessary to generate a pulse signal having a duration proportional to either the time during which the radar beam is sensed by microwave antenna 51 or the elapsed time between detection of the IFF signal and detection of the radar beam. The pulse is used to control the input of a clock frequency signal 102 into a counter 104 through gate 103. The frequency of the clock 102 can be selected or adjusted so that the count accumulated by the counter 104 corresponds to the distance from the radar station in nautical miles or fractions thereto. This count can be directly displayed on a digital indicator 105. The block 109 represents the circuit necessary to generate from the azimuth signals 12 and 14 a signal 110 corresponding to the timing pulse 18 emitted by the radar station. This pulse 110 is used to reset a range counter 108 driven by a second clock 107. A digital comparator 106 is used to generate an enabling signal 112 every time the counts accumulated in the two counters 104 and 108 coincide. The coincidence signal 112 is combined with the target signal 20 in gate 111 whose output is used in place of signal 58 to control the information to be written in the corresponding pixel. The frequency of clock 107 must be adjusted so that the range counter 108 accumulates a count corresponding to the maximum range of the radar.

While I have described the preferred embodiment of the invention and suggested modifications thereto, other embodiments may be designed in accordance with the invention and within the scope of the appended claims.

I claim:

1. A navigational aid device which comprises:
   a radar station having a narrow beam antenna scanning an area traveled by at least one craft;
   means for broadcasting over said area a signal carrying an instantaneous indication of the azimuthal orientation of the antenna, and a representation of the radar pulse and target echo timing;
   on board said craft,
   means for receiving said signal;
   a digital storage means;
   means for sequentially addressing said storage means;
   means for randomly addressing said storage means in function of the sine and cosine components of said indication wherein the combined instantaneous values of sine and cosine components define the address locations in the storage means;
   first means, responsive to said pulse and target echo timing, for writing information into said storage means in a location defined by the said instantaneous values at the time corresponding to the detection of said target echo by the radar station;
   means for extracting said information from said storage means
   by equal increments of said means for sequentially addressing;
   video means for displaying said information; and
   means for synchronizing the raster scan sequence of said video means with said means for sequentially addressing.

2. The method claimed in claim 1 which further comprises:
   computing the distance between the craft and the radar in function of said time; and
   writing an information into a location of the randomly addressed memory, said location being determined in function of said distance.

3. The device claimed in claim 1 wherein said means for broadcasting comprise:
   means for generating a first and second ramp signals synchronized with the radar pulse, said first ramp signal having an amplitude proportional to the sine component of the azimuthal orientation indication; and
   said second ramp signal having an amplitude proportional to the cosine component of the azimuthal orientation indication.

4. The device claimed in claim 3 wherein said means for addressing comprise a pair of analog to digital converters each receiving on its input one of said ramp signals.

5. The device claimed in claim 4 wherein said means for extracting comprise a sequential binary counter for generating a storage means address.

6. The device claimed in claim 5 which further comprises on board said aircraft, means for detecting the impingement of said narrow beam upon said craft; and
   second means, responsive to said means for detecting, for writing information into said storage means in at least one location defined by said instantaneous values at a time related to the impingement of said narrow beam upon said craft.

7. The device claimed in claim 6 wherein said second means for writing information comprises:
   means for measuring the distance between said craft and said radar station in function of the impingement time of said beam upon said means for detecting;
   means for determining elapsed time from the emission of each radar pulse by said radar station in function of said sine and cosine components; and
   means responsive to said means for measuring and to said means for determining, for writing information into said memory when said elapsed time corresponds to the distance between said craft and said radar station.

8. The device in claim 5 wherein said video means comprise:
   means for generating a gray level signal having an amplitude proportional to the information extracted from said storage means;
   means for generating synchro and blanking waveforms; and
   means for combining said waveform with said gray level signal to form a raster-sweep type video signal.

9. A method for displaying the radar generated image of an area on a raster-sweep type monitor, in function of the azimuthal orientation of the radar antenna and the timing of the radar pulse and target echo, which comprises:
- (a) converting the azimuthal orientation of the antenna to the sine and cosine component signals;
- (b) generating two ramp signals by repetitively charging a capacitive circuit with each of said component signals after each radar pulse;
- (c) continuously converting said ramp signals into digital values;
- (d) randomly and continuously addressing a storage memory in function of the product of said digital values;
- (e) writing an information into said randomly addressed memory in a location defined by said digital values at the time corresponding to the detection of said target echo by the radar station;
- (f) sequentially and repetitively addressing said storage memory up to a maximum address corresponding to the maximum value of said product;
- (g) generating synchro and blanking pulses in coordination with the sequential addressing of said storage means;
- (h) combining said synchro and blanking pulses with the information read out of said sequentially addressed memory; and
- (i) applying said combined synchro and blanking pulses and information to a raster-sweep type CRT monitor;

said method further comprising:

performing steps (a) and (b) at a first location;

transmitting said ramp signal and said target echo to a second location; and performing step (c) through (i) at said second location.

10. The method claimed in claim 9 wherein said second location is on board a craft traveling within said area.

11. The method claimed in claim 10 which further comprises:

recognizing the time during which the radar beam impinges upon said craft; and writing an information into said randomly addressed memory location during said time.

* * * * *